United States Patent [19]

Yoshida et al.

[11] Patent Number: 5,288,299
[45] Date of Patent: Feb. 22, 1994

[54] EXHAUST GAS TREATING APPARATUS

[75] Inventors: Hiroshi Yoshida, Kanagawa; Mitsuyoshi Kaneko; Ryuichi Ishikawa, both of Tokyo, all of Japan

[73] Assignee: Ebara Corporation, Tokyo, Japan

[21] Appl. No.: 993,806

[22] Filed: Dec. 14, 1992

Related U.S. Application Data

[63] Continuation of Ser. No. 833,786, Feb. 12, 1992, abandoned.

[30] Foreign Application Priority Data

Feb. 22, 1991 [JP]  Japan ................................ 2-50534

[51] Int. Cl.⁵ ........................ B01D 53/02; B01D 29/17
[52] U.S. Cl. .................................. 55/302; 55/379; 55/380; 55/382; 55/486; 55/528; 96/134
[58] Field of Search ................ 55/302, 316, 380–382, 55/387, 486, 487, 527, 528, 378, 379

[56] References Cited

U.S. PATENT DOCUMENTS

| | | | |
|---|---|---|---|
| 2,063,990 | 12/1936 | Dym | 55/316 |
| 2,334,840 | 11/1943 | Punton et al. | 55/316 |
| 2,400,180 | 5/1946 | Venable | 55/316 X |
| 2,825,424 | 3/1958 | Gross | 55/316 |
| 2,881,854 | 4/1959 | Uehre, Jr. | 55/316 |
| 2,925,879 | 2/1960 | Costa et al. | 55/387 |
| 2,945,554 | 7/1960 | Berly | 55/316 X |
| 3,572,014 | 3/1971 | Hansen | 55/316 |
| 3,747,303 | 7/1973 | Jordan | 55/387 X |
| 3,944,403 | 3/1976 | Simpson et al. | 55/316 |
| 4,046,525 | 9/1977 | Matsuo et al. | 55/316 X |
| 4,181,513 | 1/1980 | Fukuda et al. | 55/316 |
| 4,259,096 | 3/1981 | Nakamura et al. | 55/486 X |
| 4,261,717 | 4/1981 | Belore et al. | 55/316 X |
| 4,292,057 | 9/1981 | Ulvestad et al. | 55/379 X |
| 4,322,230 | 3/1982 | Schorn et al. | 55/316 |
| 4,339,250 | 7/1982 | Thut | 55/316 |
| 4,382,440 | 5/1983 | Kapp et al. | 55/316 X |
| 4,444,574 | 4/1984 | Tradewell et al. | 55/96 |
| 4,477,270 | 10/1984 | Tauch | 55/316 |
| 4,517,308 | 5/1985 | Ehlenz et al. | 55/316 X |
| 4,559,211 | 12/1985 | Feldman et al. | 55/97 X |
| 4,886,599 | 12/1989 | Bachmann et al. | 55/316 X |
| 4,921,606 | 5/1990 | Goldman | 55/378 X |
| 5,192,424 | 3/1993 | Beyne et al. | 55/378 X |

FOREIGN PATENT DOCUMENTS

| | | |
|---|---|---|
| 0188853 | 7/1986 | European Pat. Off. . |
| 3309497 | 9/1984 | Fed. Rep. of Germany . |
| 56-044445 | 4/1981 | Japan .................... 55/316 |
| 61-028415 | 2/1986 | Japan . |
| 63-046922 | 3/1988 | Japan . |
| 63-046922 | 3/1988 | Japan . |
| 2050194 | 1/1981 | United Kingdom . |
| 2181967 | 5/1987 | United Kingdom ........ 55/316 |
| 2234919 | 2/1991 | United Kingdom ........ 55/316 |
| 2238731 | 6/1991 | United Kingdom . |

OTHER PUBLICATIONS

Recycling International, vol. 2, 1989, pp. 1244–1264, H. Fahlenkamp, et al., "Effects of the New Refuse Incineration Plant Ordinance on the Choice of Process for Noxious Gas Separation and Treatment of Residual Matter".

Recycling International, vol. 2, 1989, pp. 1265–1277, U. Cleve, "Stand of Technical and Economical Application of Activated Carbon for Flue Gas Washing Plants with Waste Incineration".

The Kyoto Conference on Dioxins Problem of MSW (List continued on next page.)

*Primary Examiner*—Robert Spitzer
*Attorney, Agent, or Firm*—Oblon, Spivak, McClelland, Maier & Neustadt

[57] ABSTRACT

A compact exhaust gas treating apparatus which is improved in the bag filter performance in order to reduce the amount of dioxin contained in exhaust gas discharged from municipal refuse incineration equipment, industrial waste incineration equipment, etc. An activated carbon filter is disposed along the filter cloth of the bag filter at the purified gas outlet side of the filter cloth so that exhaust gas passes through the activated carbon filter after passing through the filter cloth, thereby being purified.

6 Claims, 6 Drawing Sheets

OTHER PUBLICATIONS

Incineration 1991, pp. 177–184, Satoshi Shida, et al., "Dioxin Emission From Dry Type Flue Gas Treatment".

"New High Efficient Adsorbent" Keiei Kaihatsu Center Publishing Department, Apr. 5, 1976, pp. 696–707, Tatsuki Matuo, et al.

"5. Applied Products of Activated Carbon Fiber" (with partial English translation).

Patent Abstracts of Japan, vol. 12, No. 82 (C–481), Mar. 15, 1988 & JP-A-62 216 911, Sep. 24, 1987, Wakimoto Tadaadki, et al., "Activated Carbon-Containing Silica Gel, Its Production, and Analytical Method Using said Gel as Packing Material of Cleanup Column".

EXHAUST GAS TREATING APPARATUS

This application is a continuation of application Ser. No. 07/833,786, filed on Feb. 12, 1992, now abandoned.

BACKGROUND OF THE INVENTION

The present invention relates to an exhaust gas treating apparatus wherein exhaust gas that is discharged from municipal refuse incineration equipment, industrial waste incineration equipment, etc. is passed through a filter to remove dust and reduce the amount of harmful substances, e.g., dioxin and $NO_x$, contained in the exhaust gas.

Hitherto, a bag filter has been used as an exhaust gas treating device for reducing the amounts of dust and dioxin contained in exhaust gas that is discharged from municipal refuse incineration equipment, industrial waste incineration equipment, etc. This bag filter comprises, for example, a suspended cylindrical filter cloth, which is used in such a way that an exhaust gas stream is passed through the cylindrical filter cloth from either the inner or outer side thereof and the purified exhaust gas is released from the other side.

In general, exhaust gas contains dust at a concentration of several tens of $g/Nm^3$, but it is purified to a dust concentration of several tens of $mg/Nm^3$ by passing through a bag filter. The dust collected in this way is discharged by being cleared off the cloth of the bag filter. Examples of methods of clearing the collected dust include pulse jet cleaning, back washing, shaking, etc. Among them, the pulse jet cleaning method is commonly used for exhaust gas treatment from the viewpoint of reliability and cost. The pulse jet cleaning method is carried out in such a manner that compressed air is blown into the bag filter from the purified gas side to strain and relax the filter cloth repeatedly, thereby clearing the dust from the filter cloth.

Exhaust gas from an incinerator is cooled by water spray in an exhaust gas cooler, sprayed with lime, and passed through a bag filter at 100° C. to 200° C., thereby capturing dioxin in the bag filter.

It is also known that dioxin can be removed by passing the exhaust gas through an activated carbon filter. In addition, composite filters comprising a carbon fiber layer and a reinforcing filter medium, which are formed together in an integral structure, are disclosed as filter dust separators for high temperature in Japanese Patent Public Disclosure No. 61-28415 (1986) and Japanese Utility Model Public Disclosure No. 63-46922 (1988). In these filters, however, a high-temperature strength filter medium is provided on the back surface of a carbon fiber layer to reinforce the fiber layer, but no bag filter is employed.

The rate of dioxin removal by bag filters varies widely, i.e., from 80% to 99%, and it is considered possible to lower the dioxin concentration at the bag filter outlet to about 0.5 $ng/Nm^3$. However, it is necessary in order to lower the dioxin concentration below this level to consider adopting an activated carbon filter or the like.

The activated carbon filter provides a high dioxin removal rate of about 99%, but the SV value (raw gas quantity/activated carbon quantity) is of the order of 400. Accordingly, employment of the activated carbon filter results in a considerable increase in the overall size of the exhaust gas treating apparatus, and a rise in the cost as well as an increase in the installation space.

SUMMARY OF THE INVENTION

In view of the above-described circumstances, it is an object of the present invention to provide a compact exhaust gas treating apparatus which is designed to provide a high dioxin removal rate by compensating for the low dioxin removal rate of the bag filter and eliminating the disadvantage of the activated carbon filter that the installation space is excessively large, and which also enables denitrification by addition of ammonia.

To attain the above-described object, the present invention provides an exhaust gas treating apparatus including a bag filter having a filter cloth and a retainer that supports the filter cloth so that exhaust gas is passed through the bag filter to discharge purified exhaust gas, wherein an activated carbon filter is installed along the filter cloth of the bag filter at the exhaust gas outlet side of the bag filter.

As the activated carbon filter, a filter containing granulated activated carbon and/or activated carbon fiber may be employed. When an activated carbon filter containing granulated activated carbon is employed, it is preferable to provide a means for continuously or intermittently supplying and discharging activated carbon.

Examples of activated carbon fibers usable in the present invention are those which are obtained by carbonizing and activating a raw material such as coal, pitch, rayon, acrylic fiber, phenolic fiber, etc. by a proper method. These activated carbon fibers are also known as active carbon fibers, fibrous activated carbon, etc. The activated carbon fiber may be employed in the form of a cloth.

The bag filter has a filter cloth and a retainer that is provided at the exhaust gas outlet side to support the filter cloth. Preferably, the activated carbon filter is detachably installed in between the filter cloth and the retainer, or detachably provided as an integral part of the retainer. If the activated carbon filter comprises activated carbon fiber which is in the form of a cloth, it may be formed on the back surface of the filter cloth as an integral part thereof.

The exhaust gas treating apparatus of the present invention is capable of efficiently removing dioxin from exhaust gas, and it is therefore most effectively applied to treatment of exhaust gas discharged from municipal refuse or industrial waste incineration equipment.

If a means for spraying ammonia is provided in the exhaust gas passage at the upstream side of the bag filter, it is possible to effect denitrification of exhaust gas.

By virtue of the above-described arrangement, exhaust gas that is discharged from municipal refuse incineration equipment, industrial waste incineration equipment, etc. is passed through the filter cloth to remove dust therefrom and further passed through the activated carbon filter, thereby removing dioxin from the exhaust gas at a high removal rate. If the activated carbon filter is formed as an integral part of the filter cloth of the bag filter, dust and dioxin are simultaneously removed at a high removal rate by passing exhaust gas through the filter cloth. The same effect is produced also when the activated carbon filter is detachably provided as an integral part of the retainer of the bag filter or it is detachably provided in between the retainer and the filter cloth. In such a case, it is possible to replace only the activated carbon filter, and it is also possible to clean the filter cloth effectively by pulse jet for clearing the collected dust.

If ammonia is added to exhaust gas, denitrification of $NO_x$ can be effected by the catalytic action of activated carbon or activated carbon fiber. The relationship between the amount of ammonia added and the denitrification rate is shown in FIG. 10.

Utilization of activated carbon fiber of high absorption efficiency enables a high removal rate to be obtained with a thinner layer than in the case of granulated activated carbon, so that it is possible to realize an exhaust gas treating apparatus which is compact and has a minimal pressure loss.

Since the pressure loss of activated carbon fiber is smaller than that of the filter cloth, pulse jet can be employed to clear the collected dust in the same way as in the case where no activated carbon fiber is used. When wrapped in a cloth, activated carbon fiber can be deformed in the same way as in the case of the filter cloth, so that the collected dust can be cleared by pulse jet. If activated carbon fiber is held by the retainer, the dust can be cleared off the filter cloth without deforming the activated carbon fiber.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which.

DETAILED DESCRIPTION OF THE PREFERRED EMBODIMENTS

Embodiments of the present invention will be described below with reference to the accompanying drawings. It should be noted that the present invention is not necessarily limited to these embodiments.

Embodiment 1

Figure 1:
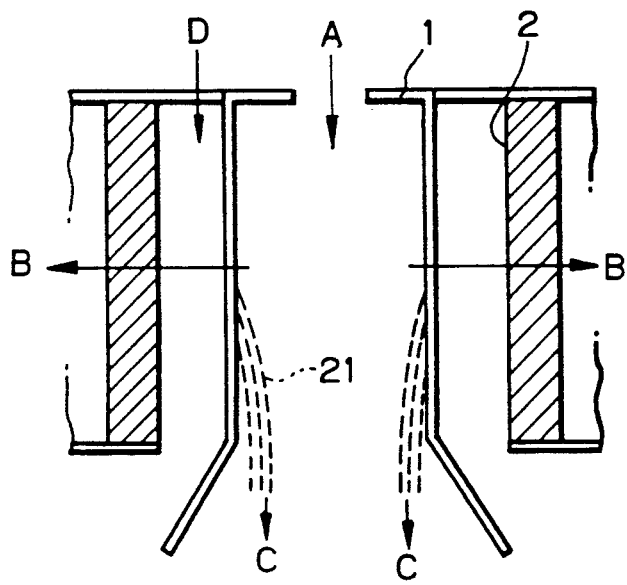
FIG. 1 is a vertical sectional view schematically illustrating one example of the arrangement of the exhaust gas treating apparatus according to the present invention.

FIG. 1 is a vertical sectional view of one example of the exhaust gas treating apparatus according to the present invention which is designed to treat exhaust gas generated from municipal refuse incineration equipment or the like. In this exhaust gas treating apparatus, a cylindrical filter cloth 1 is suspended (although a plurality of such filter cloths are provided, only one of them is illustrated). Exhaust gas flows into the inside of the filter cloth 1 from above in the direction of the arrow A. An activated carbon filter 2 is provided to surround the filter cloth 1. Exhaust gas first passes through the filter cloth 1 from the inside thereof and then passes through the activated carbon filter 2, thereby filtering dust out of the exhaust gas. The purified gas flows out in the directions of the arrows B. The dust 21 drops from the inside of the filter cloth 1 in the directions of the arrows C. In this embodiment, the activated carbon filter 2 is disposed on the purified gas side of the filter cloth 1.

Figure 2:
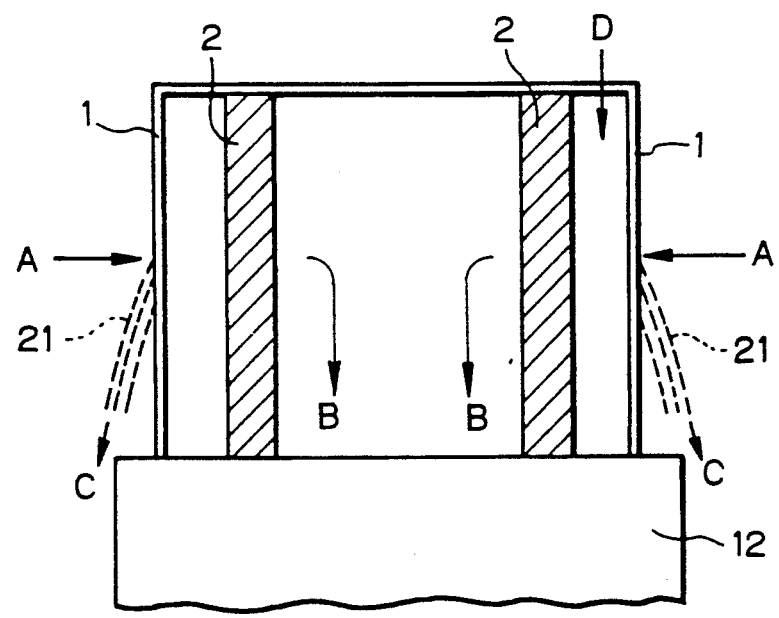
FIG. 2 is a vertical sectional view schematically illustrating another example of the arrangement of the exhaust gas treating apparatus according to the present invention.

Referring to FIG. 2, which is a vertical sectional view of another example of the exhaust gas treating apparatus according to the present invention, the activated carbon filter 2 is provided inside the cylindrical filter cloth 1 in such a manner as to extend circumferentially along the inner periphery of the filter cloth 1 in the direction of arrows A, so that exhaust gas first passes through the filter cloth 1 from the outside thereof and then passes through the activated carbon filter 2, thereby filtering dust out of the exhaust gas. The purified gas is discharged from the inside of the activated carbon filter 2 in the directions of arrows B, while the dust drops from the outside of the filter cloth 1 in the directions of arrows C. In this arrangement also, the activated carbon filter 2 is disposed on the purified gas side of the filter cloth 1. Reference numeral 12 denotes an air chamber.

In the exhaust gas treating apparatuses shown in FIGS. 1 and 2, pulse air is supplied into the gap between the activated carbon filter 2 and the filter cloth 1 in the direction of the arrow D to clear the dust from the filter cloth 1.

Figure 7:
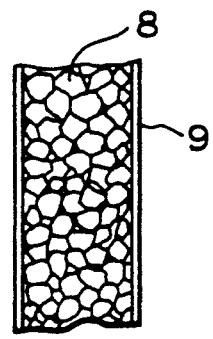
FIG. 7 is a fragmentary sectional view of an activated carbon filter employed in the present invention.

FIG. 7 shows schematically the activated carbon filter 2. As illustrated, the activated carbon filter 2 comprises two support members 9 made of iron, stainless steel or fiber, and granulated activated carbon 8 packed in the space between the support members 9. Each support member 9 is arranged in the form of a mesh or formed with a large number of openings in order to enable exhaust gas to pass therethrough. The mesh size of the support members 9 is preferably larger than that of the filter cloth of the bag filter. As the activated carbon filter 2, activated carbon fiber formed in a plate-like shape may also be employed.

Figure 8:
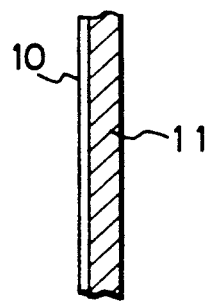
FIG. 8 is a fragmentary sectional view of one example of the bag filter employed in the present invention.
Figure 9:
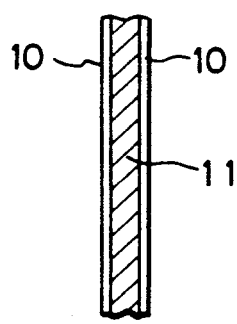
FIG. 9 is a fragmentary sectional view of another example of the bag filter employed in the present invention.
Figure 10:
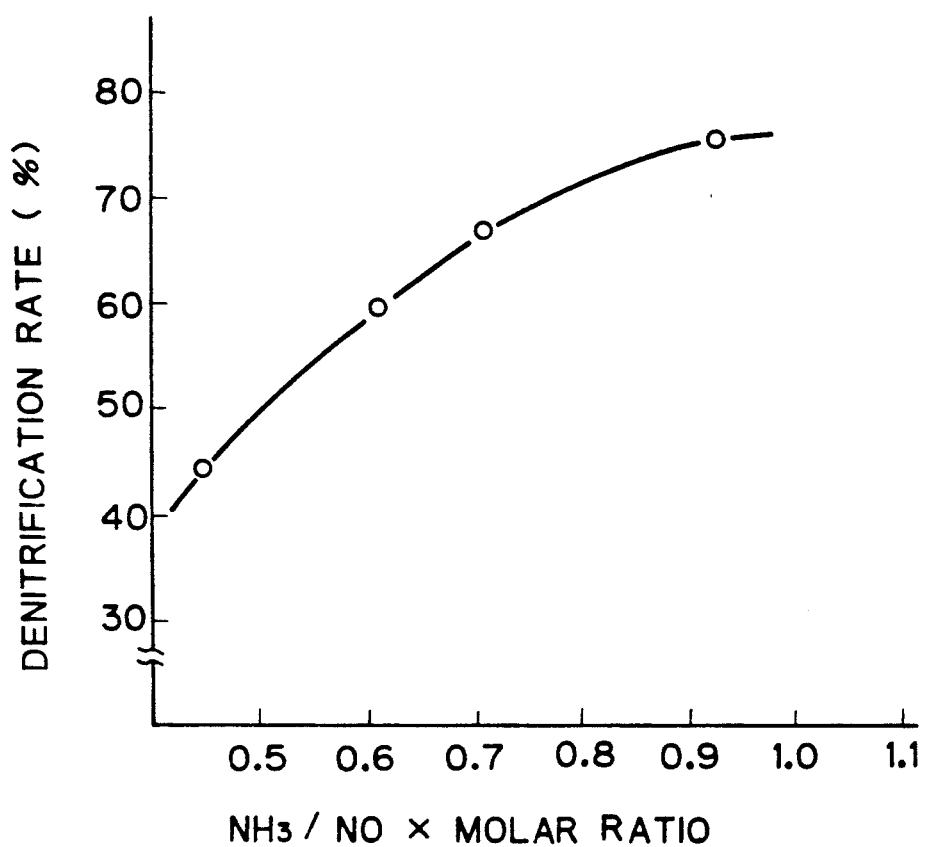
FIG. 10 is a graph showing the change of the denitrification rate in accordance with the amount of ammonia added.

Although in FIG. 7 an activated carbon filter employing granulated activated carbon is exemplarily shown, this filter may be replaced with an arrangement in which activated carbon fiber 11 is bonded to the filter cloth 10 of the bag filter, as shown in FIG. 8, or an arrangement in which activated carbon fiber 11 is sandwiched between the filter cloths 10 of the bag filter, as shown in FIG. 9.

Embodiment 2

Figure 3:
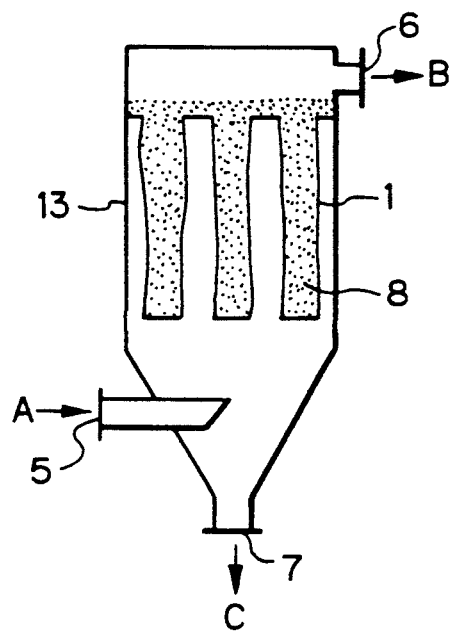
FIG. 3 is a vertical sectional view schematically illustrating still another example of the arrangement of the exhaust gas treating apparatus according to the present invention.

FIG. 3 is a vertical sectional view of a still another example of the exhaust gas treating apparatus according to the present invention. Bag-shaped filter cloths 1 are suspended inside a casing 13 that is formed in the shape of a cylinder with an inverted cone-shaped lower portion. The bag-shaped filter cloths 1 are packed with granulated activated carbon 8 to form an activated carbon filter. The casing 13 has an exhaust gas inlet port 5 provided in the lower portion thereof and an exhaust gas outlet port 6 provided in the upper portion thereof to discharge purified exhaust gas in the direction of arrow B. In addition, a dust discharge port 7 is provided in the lower end of the casing 13. Exhaust gas flowing into the casing 13 from the inlet port 5 passes through the filter cloths 1 to remove dust from the exhaust gas and subsequently passes through the granulated activated carbon 8, thereby removing harmful components such as dioxin. The purified exhaust gas is discharged from the outlet port 6.

Figure 4:
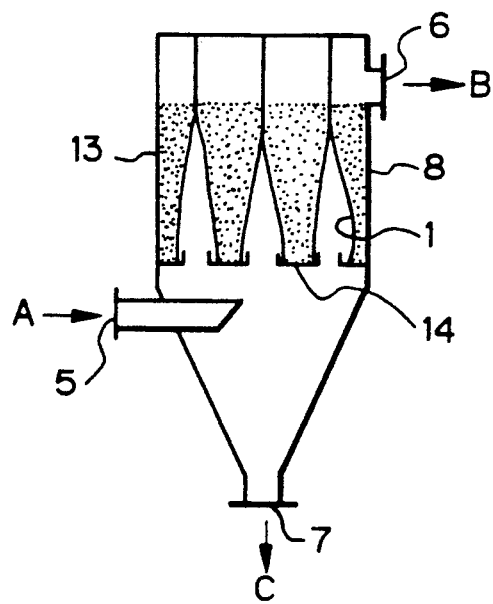
FIG. 4 is a vertical sectional view schematically illustrating a further example of the arrangement of the exhaust gas treating apparatus according to the present invention.

Referring to FIG. 4, which is a vertical sectional view of a further example of the exhaust gas treating apparatus according to the present invention, filter cloths 1 are suspended from the ceiling of the casing 13. Bottom openings defined between the filter cloths 1 are closed with bottom lids 14, respectively, and the spaces defined between the filter cloths 1 are packed with granulated activated carbon 8, thereby forming an activated carbon filter. The arrangements of the other elements are substantially the same as those of the exhaust gas treating apparatus shown in FIG. 3.

In the exhaust gas treating apparatuses shown in FIGS. 3 and 4, the pulse air method cannot be employed for cleaning the filter cloths 1 because they are packed with the activated carbon 8. Therefore, back airflow or mechanical shaking is employed. Dust that is removed by cleaning is discharged from the dust discharge port 7 in the direction of arrow C. It has been confirmed that the lifetime of activated carbon is 4,000 hours or more at present. Accordingly, the activated carbon 8 is changed at the time of routine inspection which is made twice a year in general.

Embodiment 3

Figure 5:
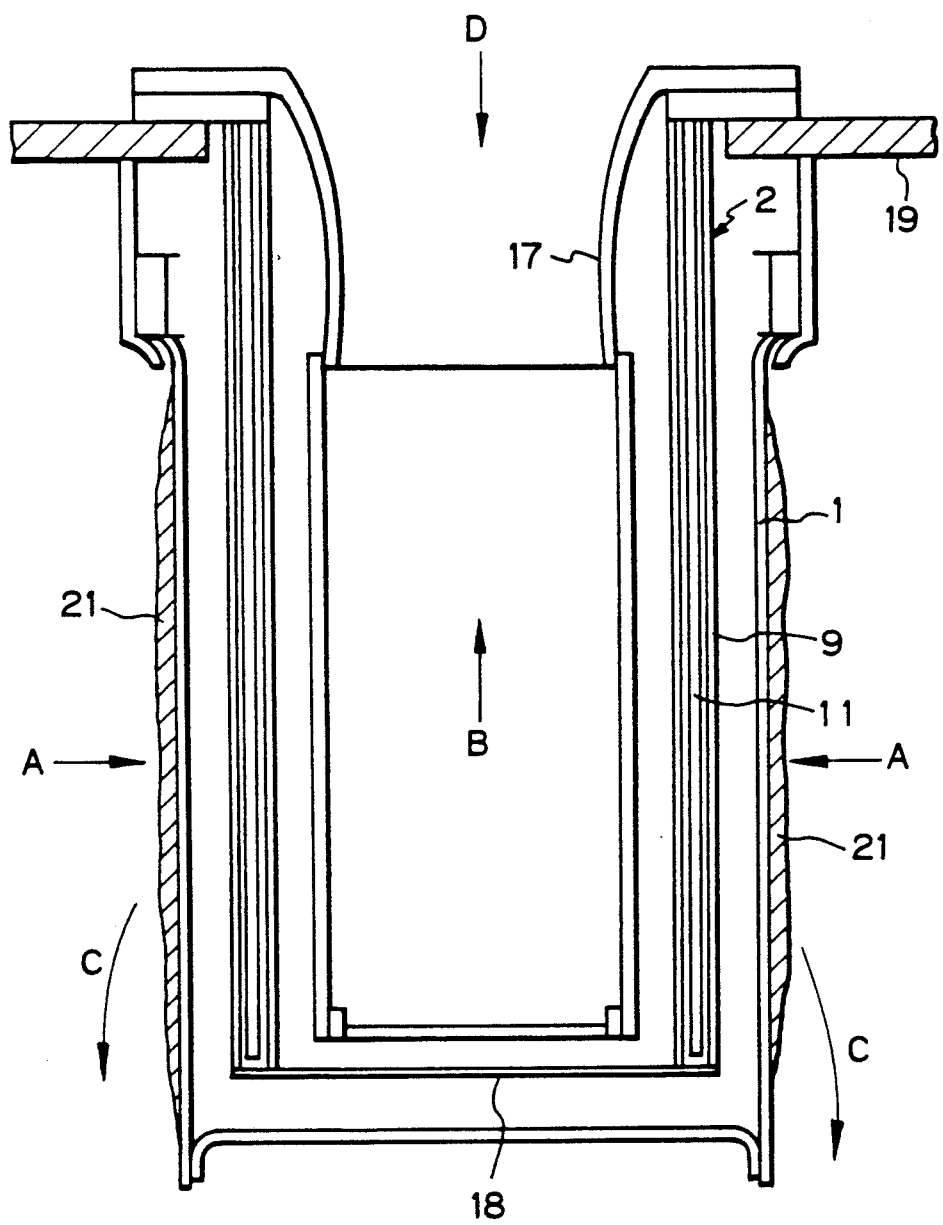
FIG. 5 is a vertical sectional view schematically illustrating a still further example of the arrangement of the exhaust gas treating apparatus according to the present invention.

FIG. 5 is a vertical sectional view of a still further example of the exhaust gas treating apparatus according to the present invention, showing a state wherein a single filter cloth that constitutes a filter is installed.

In FIG. 5, reference numeral 17 denotes a retainer which is made from a perforated iron plate for retaining the shape of the filter cloth and 18 a bottom closure for retainer 17. An activated carbon filter 2 comprises a retaining member 9 made from cloth for retaining activated carbon fiber 11. Reference numeral 1 denotes a filter cloth of a bag filter for purifying exhaust gas.

Exhaust gas flows into the bag filter in the directions of arrows A from the outside of the filter cloth 1 thereof, passes through the activated carbon filter 2 and then passes through the retainer 17, thereby being purified. The purified gas is discharged from the top of the retainer 17 in the directions of arrows B. Pulse jet for clearing dust is intermittently blown into the apparatus from the top of the retainer 17 in the direction of arrow D, thereby inflating the filter cloth 1, and thus clearing the filter cloth 1 of the dust 21 attached to the outside thereof. The activated carbon filter 2 that comprises the retaining cloth 9 and the activated carbon fiber 11 is thin and hence causes a minimal pressure loss. Accordingly, the activated carbon filter 2 will not interfere with the deformation of the filter cloth 1. The activated carbon filter 2, together with the retainer 17, is held by a top plate 19, so that it can be replaced without removing the filter cloth 1.

In the conventional bag filter, the filter cloth 1 is disposed directly outside the retainer 17, whereas, in the present invention, the activated carbon filter 2 is inserted in the space therebetween. In FIG. 5, a little gap is provided between the filter cloth 1 and the activated carbon filter 2, and also a little gap between the activated carbon filter 2 and the retainer 17. However, even if these gaps are narrow, no problem will arise.

By disposing the activated carbon filter along the filter cloth in this way, the surface area can be enlarged, so that it is possible to lower that flow velocity of gas passing through the activated carbon fiber. Thus, dioxin can be removed effectively with a minimal installation area.

Figure 6:
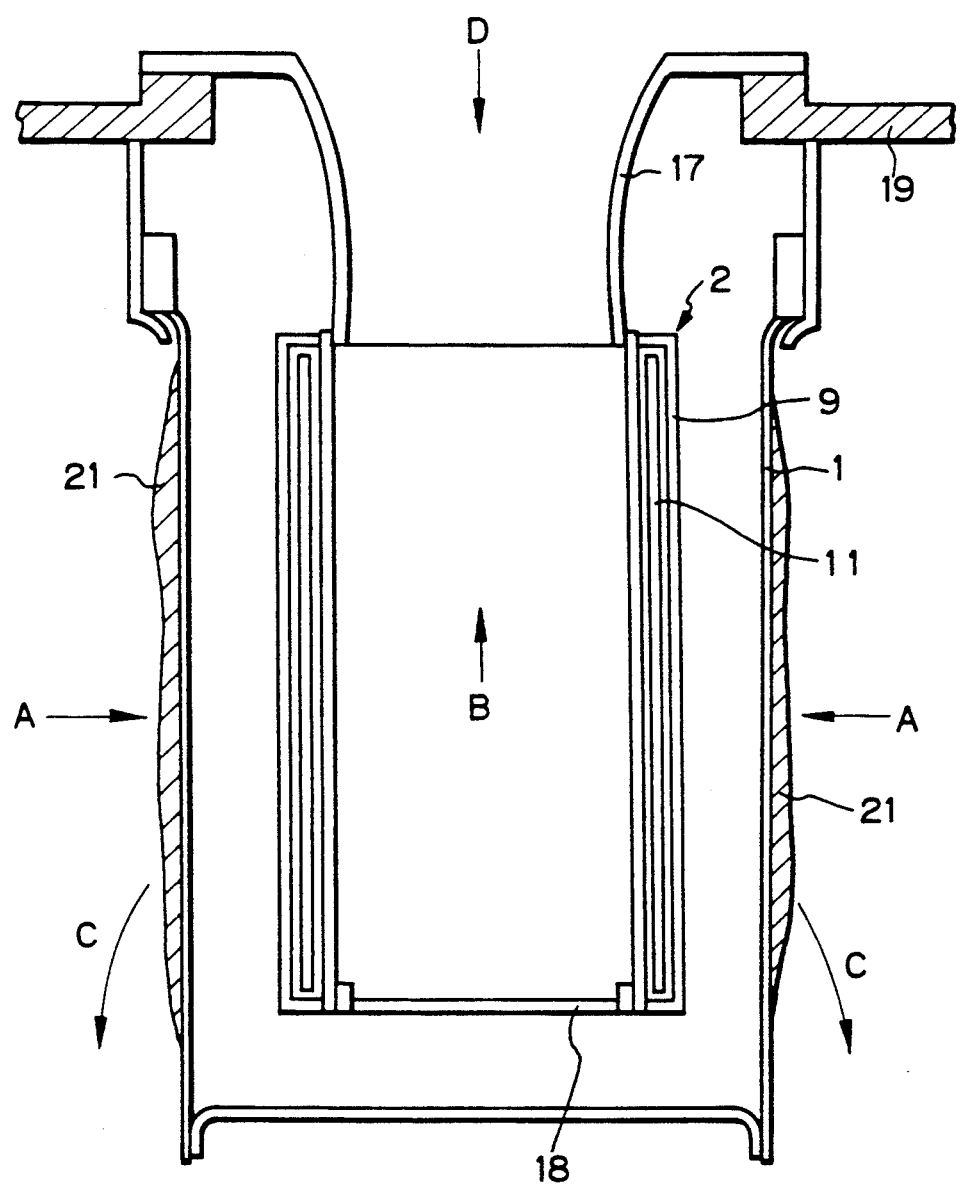
FIG. 6 is a vertical sectional view schematically illustrating a still further example of the arrangement of the exhaust gas treating apparatus according to the present invention.

FIG. 6 is a vertical sectional view of a still further example of the exhaust gas treating apparatus according to the present invention, which is a modification of the apparatus shown in FIG. 5. The arrangement shown in FIG. 6 is different from that shown in FIG. 5 only in that the activated carbon filter 2 is attached to the retainer 17 as an integral part of the latter. The exhaust gas treating apparatus shown in FIG. 6 provides the same advantageous effects as those of the apparatus shown in FIG. 5.

Thus, according to the present invention, the activated carbon filter is disposed at the purified exhaust gas outlet side of the filter cloth of the bag filter. Accordingly, dioxin in the exhaust gas can be removed by the activated carbon in the filter at high efficiency. Thus, it is possible to provide an exhaust gas treating apparatus which is compact and provides a high dioxin removal rate and which also enables denitrification by adding ammonia to the exhaust gas at a position upstream the bag filter.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. An exhaust gas treating apparatus comprising:
    a bag filter including a filter cloth for removing dust from exhaust gas which is passed through said filter cloth, said bag filter further including a retainer extending into a space defined by said bag filter for retaining a shape of said filter cloth; and
    an activated carbon filter installed radially inward of and along said filter cloth at an exhaust gas outlet side of said bag filter for removing dioxin and $NO_x$ from the exhaust gas in order to discharge purified exhaust gas;
    wherein said activated carbon filter is spaced from said filter cloth and is of a thin size for providing a minimal pressure loss when a pulse jet for clearing the dust on the filter cloth is intermittently applied against said filter cloth, such that the carbon filter will not interfere with a deformation of the filter cloth caused by said pulse jet, and wherein said activated carbon filter is detachably provided as an integral part of said retainer of said bag filter.

2. The exhaust gas treating apparatus according to claim 1, wherein said activated carbon filter contains granulated activated carbon and/or activated carbon fiber.

3. The exhaust gas treating apparatus according to claim 1, wherein said activated carbon filter is detachably installed in between said filter cloth and said retainer of said bag filter.

4. The exhaust gas treating apparatus according to any one of claims 2, 3 and 1, further comprising ammonia spray means provided in the exhaust gas passage at the inlet side of said bag filter.

5. The exhaust gas treating apparatus according to claim 4, wherein said exhaust gas is combustion gas from municipal refuse or industrial waste incineration equipment.

6. An exhaust gas treating apparatus comprising:
- a bag filter including a filter cloth for removing dust from exhaust gas which is passed through said filter cloth;
- a retainer for retaining a shape of said filter cloth, the retainer extending into a space defined by said bag filter;
- an activated carbon filter installed radially inward and spaced from said filter cloth at an exhaust gas outlet side of said bag filter for removing dioxin and $NO_x$ from the exhaust gas in order to discharge purified exhaust gas; and
- means for holding the activated carbon filter and retainer so as to permit the removal of the carbon filter and retainer from the apparatus without removing the filter cloth.

* * * * *

UNITED STATES PATENT AND TRADEMARK OFFICE
CERTIFICATE OF CORRECTION

PATENT NO. :  5,288,299
DATED      :  February 22, 1994
INVENTOR(S) : Hiroshi YOSHIDA, et al.

It is certified that error appears in the above-indentified patent and that said Letters Patent is hereby corrected as shown below:

On the title page, Item [30], the Foreign Application Priority Data should read as follows:

--Feb. 22, 1991 [JP]  Japan ................ 3-50534--

Signed and Sealed this

Twelfth Day of July, 1994

Attest:

BRUCE LEHMAN

*Attesting Officer*      *Commissioner of Patents and Trademarks*